Sept. 8, 1931.  J. H. JOHNSON  1,822,220
COMBINED ENLARGING PROJECTOR AND PHOTOGRAPHIC CAMERA
Filed July 2, 1928   3 Sheets-Sheet 1
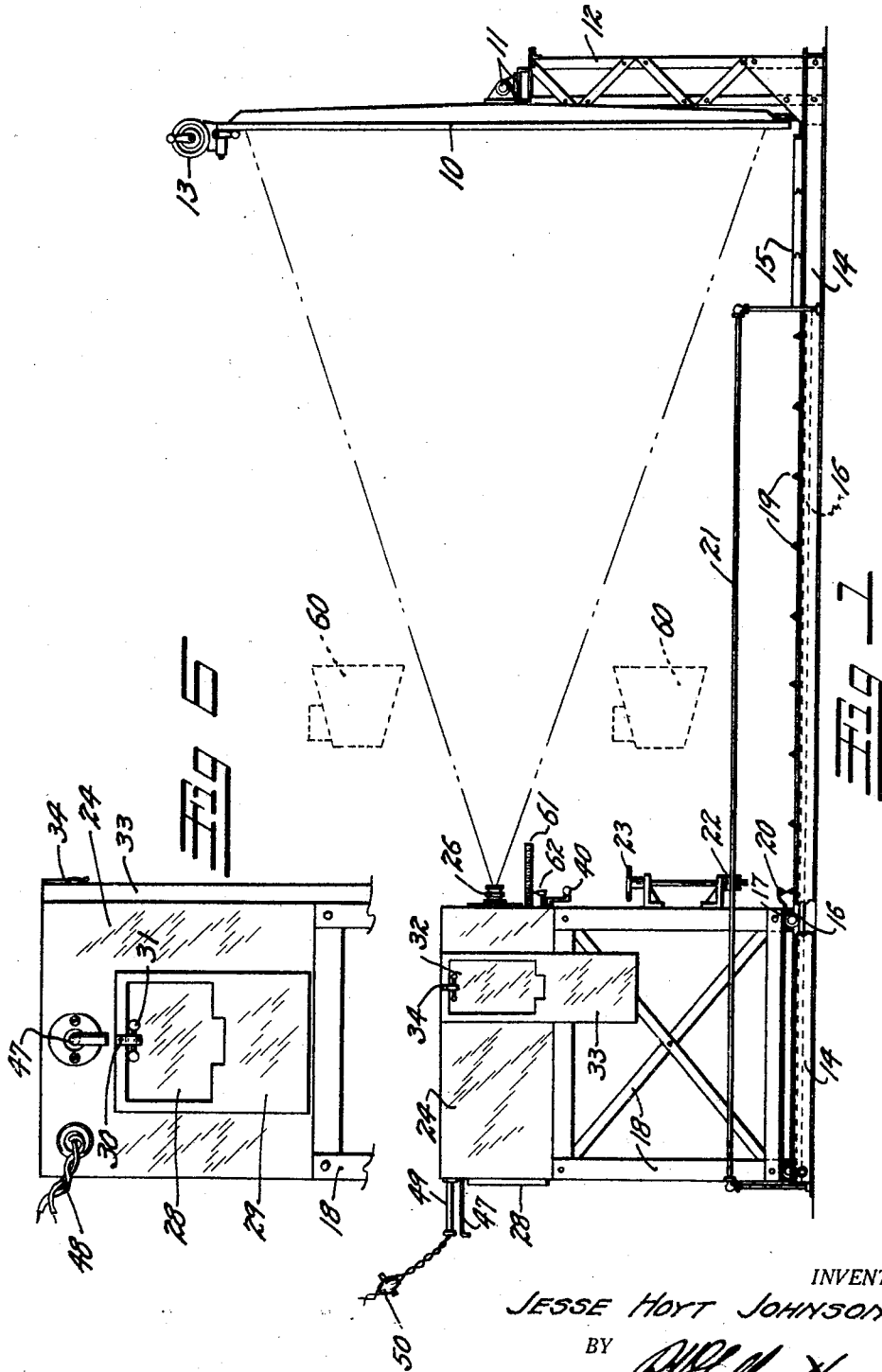
INVENTOR.
JESSE HOYT JOHNSON
BY
ATTORNEY.

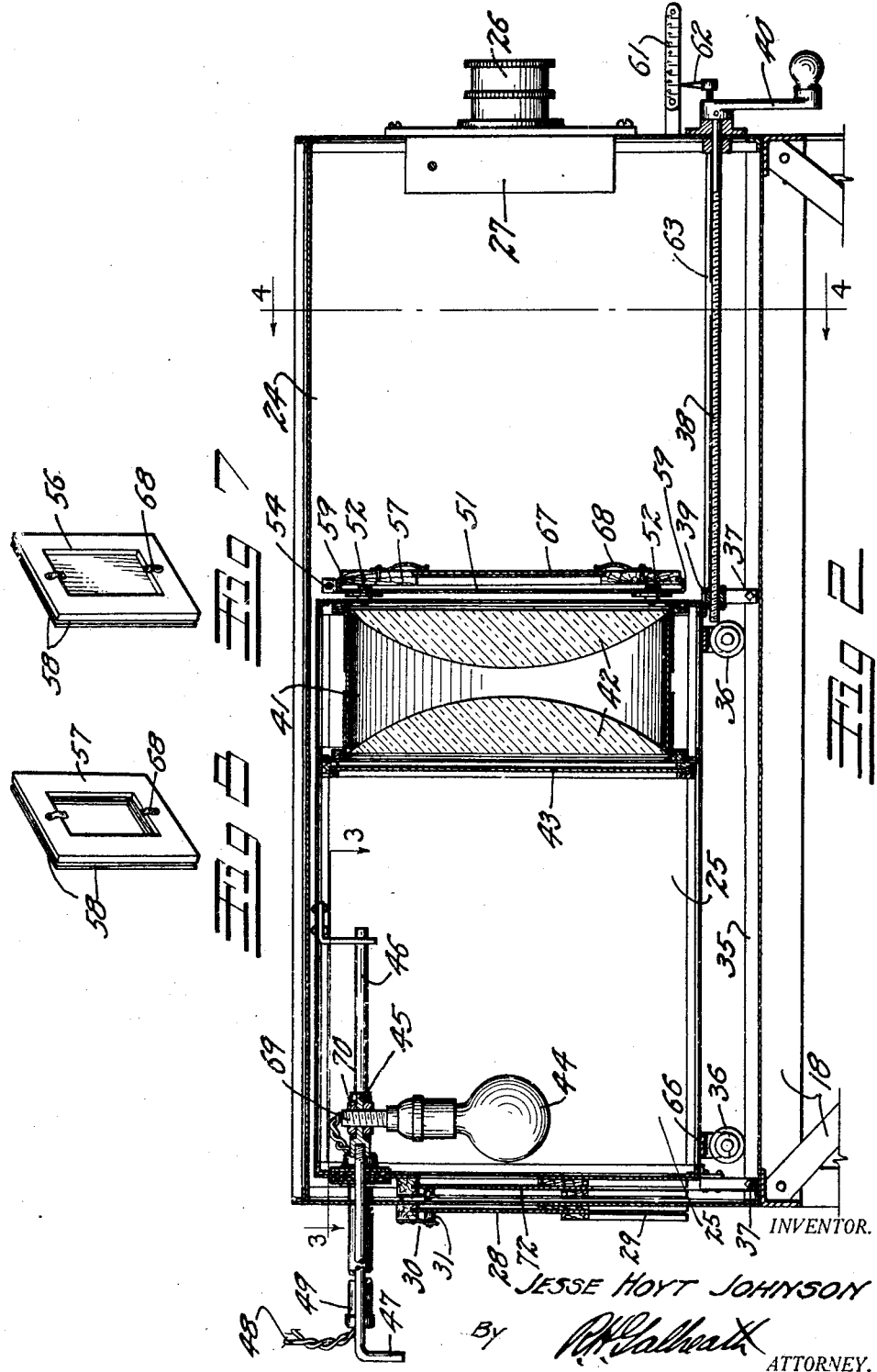

Sept. 8, 1931.  J. H. JOHNSON  1,822,220
COMBINED ENLARGING PROJECTOR AND PHOTOGRAPHIC CAMERA
Filed July 2, 1928  3 Sheets-Sheet 3
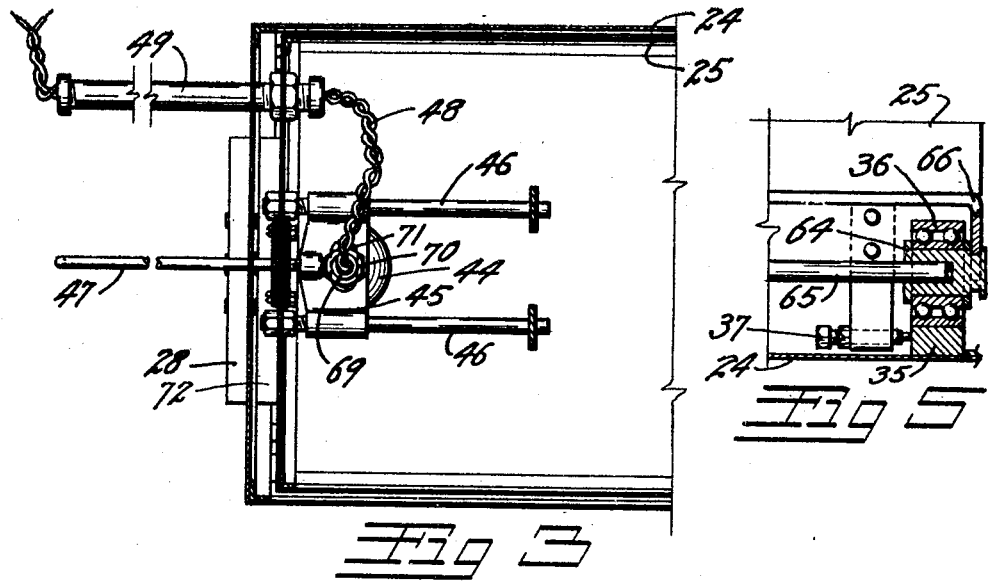
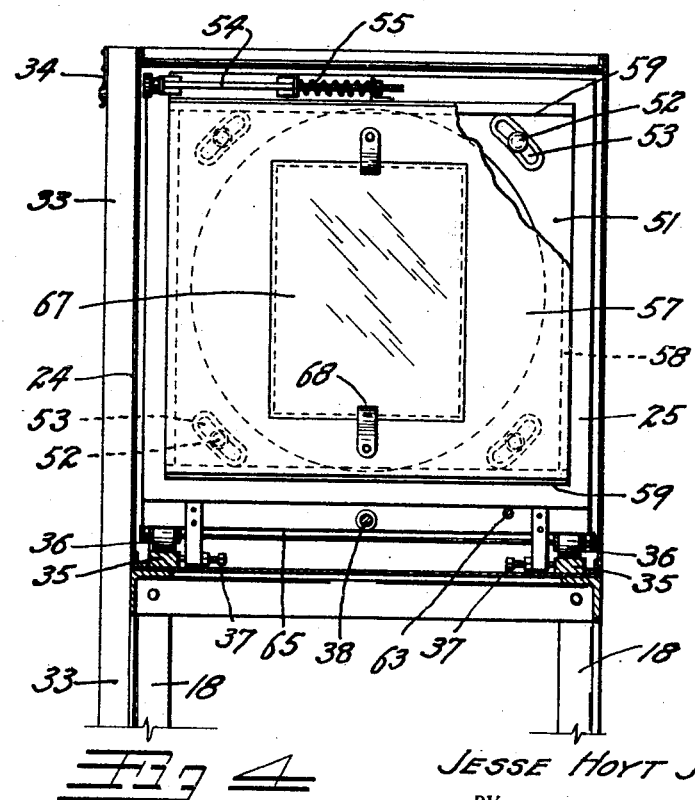
INVENTOR.
JESSE HOYT JOHNSON
BY
ATTORNEY.

Patented Sept. 8, 1931

1,822,220

UNITED STATES PATENT OFFICE

JESSE HOYT JOHNSON, OF DENVER, COLORADO

COMBINED ENLARGING PROJECTOR AND PHOTOGRAPHIC CAMERA

Application filed July 2, 1928. Serial No. 289,961.

This invention relates to a combined enlarging projector and photographic camera and has for its principal object the provision of an efficient mechanism which can be used to photograph a map, drawing, picture or similar plane object upon a plate or film and which can then be used to project light through the film or plate to throw the image of the object upon sensitized paper to any desired size.

Heretofore it has been necessary when making an enlargement or reduction of a picture to photograph the picture in a suitable camera, then transfer the developed plate or film to an enlarging projector which would throw an image of the plate upon the sensitized paper to the desired enlargement or reduction. With the use of the present invention the entire operation of photographing and projecting is carried on in the same apparatus, thus reducing the usual amount of necessary equipment and occupying a minimum amount of floor space.

Another object of the invention is to eliminate focusing movement of the lens with reference to the plate, by providing an apparatus which will move the plate or film with reference to the lens. Heretofore, cameras or projectors have required a bellows between the lens and the plate so as to allow the lens to be moved and still maintain the camera or projector light proof. In the present invention the lens is carried in a fixed position and the expensive, troublesome and easily damaged bellows is eliminated.

A further object of the invention is to provide means for quickly focusing the camera or projector by means of a scale having reference to the distance from the image or projection board.

A still further object of the invention is to provide means for rotating the plate or film holder so that the image can be easily aligned with the enlarging paper, without it being necessary to change the position of the paper on the projection board.

A still further object is to provide a photographic film holder and a projection slide holder which will be interchangeable in the apparatus, so that a film or plate can be used to receive an image and then reused to project the received image.

Other objects and advantages reside in the detail construction of the invention, which is designed for simplicity, economy, and efficiency. These will become more apparent from the following description.

In the following detailed description of the invention reference is had to the accompanying drawings which form a part hereof. Like numerals refer to like parts in all views of the drawings and throughout the description.

In the drawings:

Fig. 1 is a side elevation of my complete combined photographic camera and enlarging projector.

Fig. 2 is a longitudinal vertical section through the combined light box and camera.

Fig. 3 is a detail horizontal section taken on the line 3—3, Fig. 2.

Fig. 4 is a cross section taken on the line 4—4, Fig. 2.

Fig. 5 is a detail section through one of the rollers employed for supporting the light box within the camera.

Fig. 6 is a rear elevation of the camera.

Fig. 7 is a detail section through a typical plate or film holder employed when the device is to be used as a camera for photographing.

Fig. 8 is a similar detail view through a film or plate holder such as used when the device is to be employed as an enlarging projector.

The projection board employed with the device is described and claimed in detail in applicant's copending application, Serial No. 289,960 filed, July 2, 1928, and forms no part of the present invention. It will be simply outlined herein and it is desired to be understood that any suitable projection board could be employed with the remainder of the apparatus.

As illustrated, the projection board is shown at 10 supported from a universal bearing 11 on a supporting frame 12. The board 10 is provided with a sensitized paper roll container 13 from which the paper is drawn upon the face of the board 10 when the device is to be used for projecting or enlarging.

The supporting frame 12 is carried on the extremities of a pair of track channels 14, which support an operator's platform 15, immediately in front of the board 10. On the inner face of each of the track channels 14, a track bar 16 is secured, upon which rollers 17 travel and support a camera frame 18. One of the tracks 14 is provided with a series of spaced marks or projections 19 which register with a pointer 20 carried by the frame 18 to indicate the distance between the camera lens and the projection board 10.

A guard rail 21 extends alongside of the track members 14 and is placed so as to be engaged by a clamp 22 operated from a handle 23. The clamp 22 locks the frame 18 at any desired position along its tracks.

The camera frame 18 supports my combined photographic camera and enlarging projector which comprises two light proof boxes, one arranged to travel within the other. The outer light proof box will be designated the camera box, and indicated by the numeral 24. The inner light proof box will be designated the light box and indicated by the numeral 25.

The camera box 24 is fixedly secured to the camera frame 18, and is provided with any desired type of lens 26 and shutter mechanism 27. The lens and shutter are fixed in the forward face of the box upon its central axis.

A drop door 28 allows access to the rear end of the camera box 24. The door 28 slides within a vertical slide 29 and is maintained in the raised or closed position by means of a spring clip 30 which engages a handle bar 31. Access may be had through the side of the camera box 24 by means of a similar drop door 32 arranged to fall within a container or slide 33. The door 32 is also maintained in the raised or closed position by means of a spring clip 34.

Two track bars 35 are secured longitudinally along the floor of the camera box 24. The light box 25 is carried on rollers 36 which ride along the track bars 35. The light box is laterally aligned within the camera box 24 by means of set screws 37 which engage the inner faces of the track bars 35. By adjustment of these screws the light box can be aligned in the camera box so that there will be no contact between the two.

The rollers 36 comprise ordinary ball bearings maintained on a cap 64 fitting over the extremity of a cross shaft 65, a bifurcated bar 66 and secured to the light box and turned downwardly at its extremities to fit over a groove in the extremity of the cap 64. This bar prevents the cap from coming off the extremities of the shaft 65 and allows the light box to be lifted from its rollers should it be removed from the camera box 24.

Longitudinal adjustment of the light box is obtained by rotation of a threaded bar 38 which engages a nut 39 upon the light box and terminates on the exterior of the camera box 24, in a handle or crank 40. Access is had to the interior of the light box through a rear drop door 72 which opens opposite the drop door 28 of the camera box.

In the forward portion of the light box a suitable frame 41 supports a pair of condensing lenses 42. A diffusion plate 43, of ground glass or the like, is secured immediately back of the condensing lenses. The enlarging lamp indicated at 44 is supported from a sliding frame 45 which travels along two guide bars 46.

The lamp 44 is carried on the extremity of a threaded tube 69 which is locked by means of nuts 70 in a slotted opening 71 in the sliding frame 45. By changing the position of the nuts on the tube 69, the lamp can be vertically adjusted and by changing the position of the tube in the slotted opening 71 a lateral adjustment can be made.

The longitudinal position of the frame 45 can be changed by means of an arm 47 which extends through both boxes 24 and 25, to the rear thereof, and which can be operated to push or pull the sliding frame 45 along the guide bars 46. Current is supplied to the lamp 44 through a suitable conductor cord 48 which may be passed through a tube 49 extending through both boxes 24 and 25. The current is controlled by means of a switch 50 which can be located in any convenient position such as upon the camera box 24, if desired.

The forward face of the light box is provided with a circular opening equal in diameter to the condensing lenses 42. A holder frame 51 is rotatably secured to the forward face of the light box 25 around this opening by means of rivets 52 which travel in arcuate slots 53 in the holder. The holder may be rotated in one direction by means of an adjusting screw 54 and is returned or rotated in the other direction by means of a compression spring 55. Access may be had to the screw 54 through the drop door 32.

The holder frame 51 is designed to receive either a photographic plate or film holder 56 or a projection slide or film holder 57. Both the holders 56 and 57 are provided with grooves 58 in all of their exterior edges. The grooves 58 are designed to slide on horizontal flanges 59 formed on the holder frame 51. By this arrangement the holders 56 and 57 are interchangeable on the holder plate and they each can be placed thereon in either a vertical or a horizontal position as desired.

The two holders 56 and 57 are practically similar in construction and are provided with spring clips 68 which hold the plate or film in place. When using films the film is clamped between two glass plates 67 held in place by means of the clips 68. The photographic holder 56 has a solid back while the projection holder 57 has an open back to allow passage of the rays from the lamp 44.

Let us assume that it is desired to enlarge a map to double its size. The map is placed upon the projection board 10 and is illuminated by any desired means such as by flood lamps, as indicated in broken line at 60. A film or plate is placed in the plate holder 56 and the plate holder is placed in the holder frame 51 through the drop door 32.

Assuming that the plate used is one-fifth the size of the map being photographed, the frame 18 is moved to the fifth indicating projection 19 upon the track bars and is clamped in place by means of the clamp 22. The handle 40 is now rotated to move the light box within the camera box 24. The relative position of the two boxes can be read on a scale 61 from a pointer 62 which is carried on a pointer rod 63 extending from the light box. The pointer 62 is now set to the indication "5" on the scale 61. The operator now knows that the plate or film is in focus with the lenses and that the photographic image will be one-fifth the size of the original map. The plate or film is now exposed by means of the shutter mechanism 27 and is removed for developing. After developing, the plate or film is placed in the slide holder 57 which in turn is placed in the holder frame 51.

Since it was desired to enlarge the original map to double its original size and we now have a transparency of the map one-fifth the original size, we must now enlarge the plate to ten times its size. The frame 18 is therefore moved until the pointer 20 indicates the tenth projection 19 and the handle 40 is rotated until the pointer 62 indicates the "10" indication on the scale 61.

Sensitized paper is drawn from the container 13 and secured on the board 10. The shutter 27 is opened and the switch 50 is operated to light the lamp 44. The lamp 44 will project its rays through the ground glass 43, the condensers 42, the plate or film in the holder 57, and the lenses 26 to throw an enlarged image of the map upon the sensitized paper upon the board 10. The length of exposure is determined by the opening of the switch 50. We have now produced a map twice the size of the original in a single machine or apparatus.

The apparatus is equally adaptable for reducing as for instance, the reverse of the above described operation. From the original map to a one-tenth reduction on the film and from the one-tenth reduction on the film to a five times enlargement on the projection board. It will thus be seen that the uses of the machine are innumerable for either reducing or enlarging.

The entire operation is carried on in a darkened room except when illumination is furnished for photographing by means of the lamps 60.

For enlarging to an odd enlargement which does not exactly coincide with the scales 19 and 61, the following procedure is suggested. A film containing the outline of a scale of normal dimensions can be prepared by photographing a scale such as a yard stick or the like. This film is placed in the film holder 57 and the image of the scale is projected on the screen. The operator can now measure this image and move the camera forward or back until he has obtained the exact desired enlargement. The image of the scale can then be brought to perfect focus on the enlarging board and the clamp 22 locked to hold the camera in focus. The operator now knows that any film he places in the film holder will focus perfectly on the board in the exact desired enlargement.

This method can also be used to focus for photographing purposes at any desired intermediate position between the positions of the scale 19.

While a specific form of the improvement has been described and illustrated herein, it is desired to be understood that the same may be varied, within the scope of the appended claims, without departing from the spirit of the invention.

Having thus described the invention, what I claim and desire secured by Letters Patent is:—

1. A combined camera and projecting mechanism comprising: an outer housing; a lens in one extremity of said outer housing; an inner housing arranged to travel within said outer housing; a light source within said inner housing; means for supporting photographic media on said inner housing between said light source and said lens; means operable from the exterior of said outer housing for moving said inner housing toward or away from said lens; rollers supporting said inner housing and tracks in the bottom of said outer housing to receive said rollers; and means for aligning said inner housing with said outer housing comprising adjusting screws adapted to engage said tracks.

2. A combined camera and projecting mechanism comprising: an outer housing; a lens carried in one extremity of said outer housing; an inner housing slidable within said outer housing; a light source within said inner housing; means for supporting photographic media over an opening in said inner housing toward said lens; means for varying the position of said inner housing within said outer housing; and means for indicating the position of said inner housing comprising: a scale projecting forwardly from said outer housing; a rod secured to said inner housing and projecting through the forward face of said outer housing; and a pointer carried by said rod and adapted to indicate a position on said scale.

3. An image projecting apparatus comprising: a completely closed outer housing; a lens in one face of said outer housing; an inner housing movable within said outer housing; a back wall in said inner housing; means operable from the exterior of the outer housing for moving said inner housing within said outer housing; a light source within said inner housing; means for varying the position of said light source within said inner housing comprising: a supporting frame therefor; slide bars extending from said back wall and slidably engaged by said supporting frame; and means for moving said supporting frame along said slide bars, said means extending through said back wall and operable from the exterior of said outer housing.

4. An image projecting apparatus comprising: a completely closed outer housing; a lens in one face of said outer housing; a completely closed inner housing movable within said outer housing; means operable from the exterior of the outer housing for moving said inner housing within said outer housing; a light source within said inner housing; means for varying the position of said light source within said inner housing from the exterior of said outer housing.

5. An image projecting apparatus comprising: an outer housing; a lens in one face of said outer housing; an inner housing movable within said outer housing; condensing lenses in one end of said inner housing; a rear wall in the opposite end of said inner housing; means operable from the exterior of the outer housing for moving said inner housing within said outer housing; a light source within said inner housing; means for varying the position of said light source within said inner housing comprising: a supporting frame therefor; slide bars extending from said rear wall and slidably engaged by said supporting frame; means for moving said supporting frame along said slide bars, said means extending through said rear wall and being operable from the exterior of said outer housing; and means for varying the lateral position of said light source within said light supporting frame.

6. A combined camera and projecting mechanism comprising: an outer housing; a lens in one extremity of said outer housing; an inner housing arranged to travel within said outer housing; a rear wall in said inner housing; a light source within said inner housing; means for supporting photographic media on said inner housing between said light source and said lens; means operable from the exterior of said outer housing for moving said inner housing toward or away from said lens; a longitudinal track suspended within said inner housing; a frame slidably mounted upon said track and adapted to support said light source; and an arm extending from said track through said rear wall to the exterior of said outer housing so that the position of said light source may be adjusted.

In testimony whereof, I affix my signature.

JESSE HOYT JOHNSON.